US009860026B2

(12) United States Patent
Guo et al.

(10) Patent No.: US 9,860,026 B2
(45) Date of Patent: Jan. 2, 2018

(54) METHODS, USER EQUIPMENT AND RADIO NETWORK NODE FOR HARQ ACK/NACK BUNDLING ON PUSCH IN A DYNAMIC TDD SYSTEM

(71) Applicant: Telefonaktiebolaget L M Ericsson (publ), Stockholm (SE)

(72) Inventors: Zhiheng Guo, Beijing (CN); Shaohua Li, Beijing (CN); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

(21) Appl. No.: 14/406,781

(22) PCT Filed: May 10, 2013

(86) PCT No.: PCT/CN2013/075507
§ 371 (c)(1),
(2) Date: Dec. 10, 2014

(87) PCT Pub. No.: WO2014/180001
PCT Pub. Date: Nov. 13, 2014

(65) Prior Publication Data
US 2015/0155979 A1 Jun. 4, 2015

(51) Int. Cl.
*H04W 4/00* (2009.01)
*H04L 1/18* (2006.01)
(Continued)

(52) U.S. Cl.
CPC .......... *H04L 1/1887* (2013.01); *H04L 1/1607* (2013.01); *H04L 1/1671* (2013.01);
(Continued)

(58) Field of Classification Search
None
See application file for complete search history.

(56) References Cited

U.S. PATENT DOCUMENTS

| 9,252,927 B2* | 2/2016 | Chen ..................... H04L 1/1854 |
| | | 370/252 |
| 2011/0176443 A1* | 7/2011 | Astely .................. H04L 1/1607 |
| | | 370/252 |

(Continued)

FOREIGN PATENT DOCUMENTS

| CN | 101938340 | 1/2011 |
| CN | 102124686 | 7/2011 |
| WO | WO 2010 019088 | 2/2010 |

OTHER PUBLICATIONS

PCT Notification of Transmittal of International Preliminary Report on Patentability for International application No. PCT/CN2013/075507, dated Sep. 15, 2015.

(Continued)

*Primary Examiner* — Anh-Vu Ly
(74) *Attorney, Agent, or Firm* — Baker Botts, LLP (57) ABSTRACT

The present disclosure relates to a method for HARQ ACK/NACK bundling on a PUSCH in a TDD system. The method comprises choosing a scramble code selecting parameter from a predefined set of scramble code selecting parameters, wherein each scramble code selecting parameter is associated with one of one or more downlink subframes to be received and one or more HARQ ACK/NACK bits with respect to the one or more downlink subframes are to be transmitted in a predetermined uplink subframe, or calculating a scramble code selecting parameter based on the number of detected downlink subframes. The method also comprises scrambling one or more HARQ ACK/NACK bits using the chosen scramble code selecting parameter or the calculated scramble code selecting parameter for bundling on the PUSCH. The present disclosure also relates to corresponding UE and a radio network node for HARQ ACK/NACK bundling on a PUSCH in a TDD system.

12 Claims, 5 Drawing Sheets

(51) Int. Cl.
*H04L 5/00* (2006.01)
*H04L 5/14* (2006.01)
*H04W 72/04* (2009.01)
*H04L 1/16* (2006.01)

(52) U.S. Cl.
CPC .......... *H04L 1/1812* (2013.01); *H04L 1/1829* (2013.01); *H04L 5/0055* (2013.01); *H04L 5/14* (2013.01); *H04W 72/042* (2013.01)

(56) References Cited

U.S. PATENT DOCUMENTS

| | | | |
|---|---|---|---|
| 2012/0034927 A1* | 2/2012 | Papasakellariou | H04L 1/1861 455/450 |
| 2012/0106569 A1* | 5/2012 | Che | H04L 1/1671 370/437 |
| 2012/0266053 A1 | 10/2012 | Kang et al. | |
| 2012/0281645 A1* | 11/2012 | Li | H04L 1/1829 370/329 |
| 2013/0114477 A1 | 5/2013 | Jang et al. | |
| 2013/0121274 A1* | 5/2013 | Chen | H04L 5/0053 370/329 |
| 2014/0293893 A1* | 10/2014 | Papasakellariou | H04W 72/04 370/329 |
| 2014/0328292 A1* | 11/2014 | Yang | H04L 1/1812 370/329 |
| 2016/0081068 A1* | 3/2016 | Li | H04W 72/042 370/280 |
| 2016/0081113 A1* | 3/2016 | Li | H04W 72/1289 370/280 |

OTHER PUBLICATIONS

ETSI TS 136 213 V10.3.0 (Oct. 2011) LTE; Evolved Universal Terrestrial Radio Access (E-UTRA); Physical layer procedures (3GPP TS 36.213 version 10.3.0 Release 10).
ETSI TS 136 212 V10.1.0 (Apr. 2011) LTE; Evolved Universal Terrestrial Radio Access (E-UTRA); Multiplexing and channel coding (3GPP TS 36.212 version 10.1.0 Release 10).
PCT Written Opinion of the International Searching Authority for International application No. PCT/CN2013/075507, dated Jan. 28, 2014.
PCT International Search Report for International application No. PCT/CN2013/075507, dated Feb. 13, 2014.
Supplementary European Search Report for Application No. EP 13 88 4126—dated Dec. 5, 2016.

* cited by examiner

METHODS, USER EQUIPMENT AND RADIO NETWORK NODE FOR HARQ ACK/NACK BUNDLING ON PUSCH IN A DYNAMIC TDD SYSTEM

PRIORITY

This nonprovisional application is a U.S. National Stage Filing under 35 U.S.C. §371 of International Patent Application Serial No. PCT/CN2013/075507, filed May 10, 2013, and entitled "METHODS, USER EQUIPMENT AND RADIO NETWORK NODE FOR HARQ ACK/NACK BUNDLING ON PUSCH IN A DYNAMIC TDD SYSTEM."

TECHNICAL FIELD

The technology presented in this disclosure generally relates to radio communication networks, particularly (though not exclusively) radio communication networks using Time Division Duplex (TDD), for example Long-Term Evolution (LTE) TDD. More particularly, the present disclosure relates to methods, a user equipment and a radio network node for Hybrid Automatic Retransmission Request (HARQ) Acknowledgement (ACK)/Negative-Acknowledgement (NACK) bundling on a Physical Uplink Sharing Channel (PUSCH) in a dynamic TDD system.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Transmission and reception from a node, e.g., a radio terminal like a User Equipment (UE) in a cellular system such as LTE, can be multiplexed in the frequency domain or in the time domain (or combinations thereof). In Frequency Division Duplex (FDD), downlink (DL) and uplink (UL) transmission take place in different, sufficiently separated, frequency bands. In Time Division Duplex (TDD), DL and UL transmission take place in different, non-overlapping time slots. Thus, TDD can operate in unpaired frequency spectrum, whereas FDD generally requires paired frequency spectrum.

Typically, a transmitted signal in a radio communication system is organized in some form of frame structure, or frame configuration. For example, LTE generally uses ten equally sized subframes 0-9 of length 1 ms per radio frame. In case of TDD, there is generally only a single carrier frequency, and UL and DL transmissions are separated in time. Because the same carrier frequency is used for uplink and downlink transmission, both the base station (BS) and the UEs need to switch from transmission to reception and vice versa. An important aspect of a TDD system is to provide a sufficiently large guard time where neither DL nor UL transmissions occur in order to avoid interference between UL and DL transmissions. For LTE, special subframes (e.g., subframe #1 and, in some cases, subframe #6) provide this guard time. A TDD special subframe is generally split into three parts: a downlink part (DwPTS), a guard period (GP), and an uplink part (UpPTS). The remaining subframes are either allocated to UL or DL transmission.

TDD allows for different asymmetries in terms of the amount of resources allocated for UL and DL transmission, respectively, by means of different DL/UL configurations. In LTE, there are seven different configurations. Generally speaking, to avoid significant interference between DL and UL transmissions between different radio cells, neighboring radio cells should have the same DL/UL configuration. Otherwise, UL transmission in one radio cell may interfere with DL transmission in the neighboring radio cell (and vice versa). As a result, the DL/UL asymmetry generally does not vary between radio cells. The DL/UL asymmetry configuration is signaled, i.e., communicated, as part of the system information and can remain fixed for a long time.

Consequently, the TDD networks generally use a fixed frame configuration where some subframes are UL subframes and some are DL subframes. This may prevent or at least limit the flexibility to adopt the UL and/or DL resource asymmetry to varying radio traffic situations.

In future networks, it is envisioned that we will see more and more localized traffic, where most of the users will be in hotspots, or in indoor areas, or in residential areas. These users will be located in clusters and will produce different UL and DL traffic at different time. This essentially means that a dynamic feature to adjust the UL and DL resources to instantaneous (or near instantaneous) traffic variations would be required in future local area cells.

Figure 1:
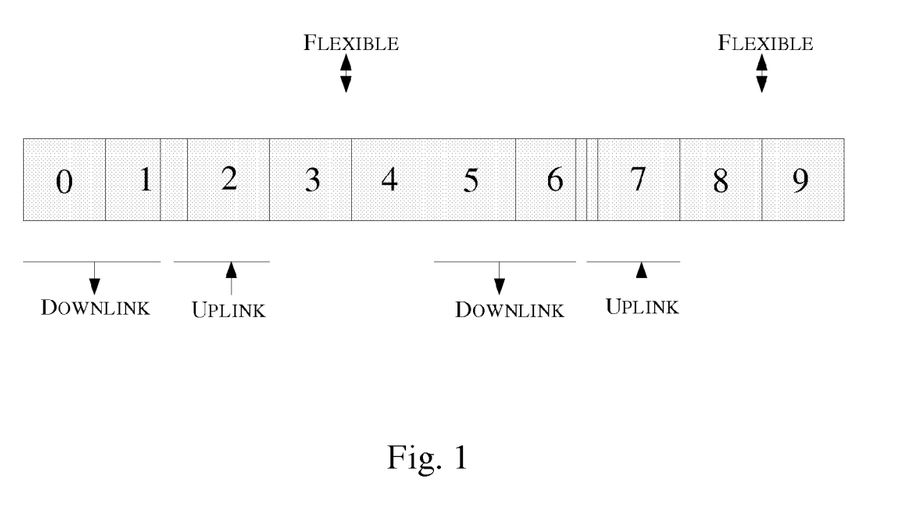
FIG. 1 illustrates dynamic TDD settings in a dynamic TDD system according to example embodiments of the present disclosure.

In the current networks, UL/DL configuration is semi-statically configured, thus it may not match the instantaneous traffic situation. This will result in inefficient resource utilization in both UL and DL, especially in cells with a small number of users. In order to provide a more flexible TDD configuration, so-called Dynamic TDD (also sometimes referred to as Flexible TDD) has therefore been introduced. Dynamic TDD configures the TDD UL/DL asymmetry to current traffic situation in order to optimize user experience. For a better understanding of the Dynamic TDD subframe configurations, FIG. 1 illustrates an example Dynamic TDD subframe configuration.

In the illustrated configuration, Dynamic TDD provides an ability of configuring some subframes to be "flexible" subframes, for example, subframes 3, 4, 8, and 9. These flexible subframes can be configured dynamically and flexibly as either for UL transmission or for DL transmission. The subframes being configured as either for UL transmission or DL transmission reply on e.g. the radio traffic situation in a cell. Accordingly, it is expected that Dynamic TDD can achieve promising performance improvements in TDD systems when there is a potential load imbalance between UL and DL. Besides, Dynamic TDD approach can also be utilized to reduce network energy consumption. It is expected that dynamic UL/DL allocation (hence referred in this section "Dynamic TDD") should provide a good match of allocated resources to instantaneous traffic.

Further, in Layer one (L1) controlled dynamic TDD, whether the flexible subframe is a downlink or an uplink subframe is decided by the eNB and the UE will follow the uplink and downlink grant or some indicators from the eNB to judge the subframe is a downlink or an uplink subframe. If the eNB schedules the UE in the flexible subframe as uplink, then the UE will transmit on the subframe as uplink. Similarly, if the eNB schedules the UE in the flexible subframe as downlink, the UE will receive the downlink signal in the flexible subframe. The uplink scheduling grant could be detected by the UE in the fixed downlink subframe before the flexible subframes. The downlink scheduling grant could be detected in the scheduled flexible subframes. When the UE is not scheduled in the flexible subframes, then UE will treat the flexible subframe as downlink subframe.

In the current 3GPP protocols, when a PUSCH is scheduled, the Uplink Control Information (UCI), if any, will be multiplexed in the PUSCH. The ACK/NACK bits for the downlink transport blocks are one kind of the UCI. According to 3GPP Technical Specification 3*GPP TS* 36.213, *"Evolved Universal Terrestrial Radio Access (E-UTRA); Physical layer procedures"*, v.11.1.0), For the case that the UE is transmitting on PUSCH and the PUSCH transmission is adjusted based on a detected Physical Downlink Control Channel (PDCCH) with DCI format 0/4 or with uplink grant intended for the UE and TDD UL-DL configurations 1-6, if $V_{DAI}^{UL} \neq (U_{DAI}+N_{SPS}-1) \bmod 4+1$, the UE detects that at least one downlink assignment has been missed and the UE shall generate NACK for all codewords where $N_{bundled}$ is determined by the UE as $N_{bundled}=V_{DAI}^{UL}+2$. If the UE does not detect any downlink assignment missing, $N_{bundled}$ is determined by the UE as $N_{bundled}=V_{DAI}^{UL}$. The UE shall not transmit HARQ-ACK if $U_{DAI}+N_{SPS}=0$ and $V_{DAI}^{UL}=4$; and For the case that the UE is transmitting on PUSCH, and the PUSCH transmission is not based on a detected PDCCH with DCI format 0/4 or with uplink grant intended for the UE and TDD UL-DL configurations 1-6, if $U_{DAI}>0$ and $V_{DAI}^{DL} \neq (U_{DAI}-1) \bmod 4+1$, the UE detects that at least one downlink assignment has been missed and the UE shall generate NACK for all codewords. The UE determines $N_{bundled}=(U_{DAI}+N_{SPS})$ as the number of assigned subframes. The UE shall not transmit HARQ-ACK if $U_{DAI}+N_{SPS}=0$, wherein $V_{DAI}^{UL}$ is the value of the Downlink Assignment Index (DAI) in DCI format 0/4 and $U_{DAI}$ is the total number of PDCCH(s) with assigned PDSCH transmission(s) and PDCCH indicating downlink SPS release detected by the UE within the subframe(s) n−k in serving cell, where k∈K according to table 10.1-1 in 3GPP TS 36.213, which is reproduced as below:

TABLE 10.1-1

Downlink association set index K: $\{k_0, k_1, \ldots k_{M-1}\}$ for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

$N_{SPS}$, which can be zero or one, as the number of PDSCH transmissions without a corresponding PDCCH within the subframe(s) n−k, where k∈K for UL-DL configuration 2 or the UL-DL configuration with the most downlink subframes. $N_{bundled}$ is used to select the scramble code sequence for the HARQ bits (possibly subject to necessary coding) in PUSCH.

In L1 controlled dynamic TDD (referring to R1-130558 *"Signalling support for dynamic TDD"*, Ericsson, ST-Ericsson), the UE will adjust its scheduling timing for UL and DL based on two reference TDD configurations respectively. The UE will schedule UL transmission based on a reference UL TDD configuration and schedule DL transmissions based on a reference DL TDD configurations. One example is to schedule UL transmissions using TDD configuration 0 and to schedule DL transmissions using TDD configuration 1. In this case, subframe #4 and #9 are used as flexible subframes, which can be used as for either UL or DL.

The benefits with the L1 controlled dynamic TDD are in that it provides fully dynamic control giving the largest performance benefits. It also ensures that control signaling, other than DL scheduling, will not experience cross link interference. It has a natural way of handling HARQ continuity between switches. It also has minimum signaling overhead since the direction is controlled implicitly by the scheduling, which is needed for each transmission anyway.

However, in the L1 controlled Dynamic TDD, the uplink scheduling mechanism is following the scheduling mechanism of the UL-DL configuration 0. Then the two bits for DAI in DCI format 0/4 in UL-DL configuration 1-6 are always treated as UL-DL index in L1 controlled dynamic TDD. Due to this, there will be no more bits for the eNB to inform the UE about the parameter of DAI. Without knowledge of the DAI, the UE cannot determine the value of parameter $N_{bundled}$ that will be used for scrambling and bundling the HARQ bits on PUSCH.

SUMMARY

To address or mitigate at least one of the above potential problems, example embodiments of the present disclosure would provide for an efficient way of determining the value of $N_{bundled}$ such that the UE is able to use a proper value of the $N_{bundled}$ to scramble the HARQ bits on the PUSCH.

According to one aspect of the present disclosure, there is provided a method for HARQ ACK/NACK bundling on a PUSCH in a dynamic TDD system. The method comprises choosing a scramble code selecting parameter from a predefined set of scramble code selecting parameters, wherein each scramble code selecting parameter is associated with one of one or more downlink subframes to be received and one or more HARQ ACK/NACK bits with respect to the one or more downlink subframes are to be transmitted in a predetermined uplink subframe or the method comprises calculating a scramble code selecting parameter based on the number of detected downlink subframes. The method also comprises scrambling one or more HARQ ACK/NACK bits using the chosen scramble code selecting parameter or the calculated scramble code selecting parameter for bundling on the PUSCH.

According to another aspect of the present disclosure, there is provided a method for HARQ ACK/NACK bundling on a PUSCH in a dynamic TDD system. The method comprises receiving one or more scrambled HARQ ACK/NACK bits bundled on the PUSCH from a user equipment. The method also comprises descrambling the one or more scrambled HARQ ACK/NACK bits using one or more scramble code selecting parameters chosen from a predefined set of scramble code selecting parameters in which each scramble code selecting parameter is associated with one of one or more downlink assignments, or comprises descrambling the one or more scrambled HARQ ACK/NACK bits using a scramble code selecting parameter corresponding to the number of scheduled physical downlink sharing channels (PDSCHs) for the user equipment.

According to another aspect of the present disclosure, there is provided a user equipment for HARQ ACK/NACK bundling on a PUSCH in a dynamic TDD system. The user equipment comprises a choosing module configured to choose a scramble code selecting parameter from a predefined set of scramble code selecting parameters, wherein each scramble code selecting parameter is associated with one of one or more downlink subframes to be received and one or more HARQ ACK/NACK bits with respect to the one or more downlink subframes are to be transmitted in a predetermined uplink subframe, or a calculating module configured to calculate a scramble code selecting parameter based on the number of detected downlink subframes. The user equipment also comprises a scrambling module configured to scramble one or more HARQ ACK/NACK bits using the chosen scramble code selecting parameter or the calculated scramble code selecting parameter for bundling on the PUSCH. The user equipment further comprises a transmitter (740) configured to transmit the one or more scrambled HARQ ACK/NACK bits bundled on the PUSCH to a radio network node.

According to another aspect of the present disclosure, there is provided a radio network node for HARQ ACK/NACK bundling on a PUSCH in a dynamic TDD system. The radio network node comprises a receiver configured to receive one or more scrambled HARQ ACK/NACK bits bundled on the PUSCH from a user equipment. The radio network node also comprises a descrambling module configured to descramble the one or more scrambled HARQ ACK/NACK bits using one or more scramble code selecting parameters chosen from a predefined set of scramble code selecting parameters in which each scramble code selecting parameter is associated with one of one or more downlink assignments, or configured to descramble the one or more scrambled HARQ ACK/NACK bits using a scramble code selecting parameter corresponding to the number of scheduled physical downlink sharing channels (PDSCHs) for the user equipment.

With the aspects of the present disclosure above, together with example embodiments as discussed below, it is easy to implement the HARQ ACK/NACK bundling in L1 controlled dynamic TDD since no further complex calculation is needed for determination of the scramble code selecting parameter (i.e., $N_{bundled}$).

Further, the aspects of the present disclosure and example embodiments can be advantageously applied when the UE is in an ambiguous state with respect to the base station (BS). In particular, when the BS (e.g., eNB) instructs the UE to switch from a fixed UL-DL configuration state to a flexible UL-DL configuration state through dedicated RRC signaling, the eNB cannot exactly know when the RRC signaling arrives at the UE and when the RRC signaling takes effect. Due to this, the eNB is unable to determine whether the UE is in the fixed UL-DL configuration or in the flexible UL-DL configuration, i.e., the UE being in an ambiguous state. With the solutions as mentioned above and will be discussed later, when only special subframes are scheduled in the ambiguous state, then no mismatch occurs between the eNB and the UE regarding the parameter of $N_{bundled}$, if the $N_{bundled}$ corresponding to the special subframe is predefined as e.g., 1.

Additionally, based on the predefined set of scramble code selecting parameters, the eNB may know which downlink assignment is missed by the UE and then the eNB only needs to retransmit the transmission blocks that the UE missed.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following description, for purposes of explanation and not limitation, specific details are set forth such as particular architectures, interfaces, techniques, etc. However, it will be apparent to those skilled in the art that the technology described here may be practiced in other embodiments that depart from these specific details. That is, those skilled in the art will be able to devise various arrangements which, although not explicitly described or shown herein, embody the principles of the technology described and are included within its scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof.

Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology. Similarly, it will be appreciated that any flow charts and the like represent various processes which may be substantially represented in computer readable medium and so executed by a computer or processor, no matter whether or not such computer or processor is explicitly shown.

The functions of the various elements including functional blocks labeled or described as "processor" may be provided through the use of dedicated hardware as well as hardware capable of executing software in the form of coded instructions stored on computer readable medium. When provided by a processor, the functions may be provided by a single dedicated processor, by a single shared processor, or by a plurality of individual processors, some of which may be shared or distributed. Such functions are to be understood as being computer-implemented and thus machine-implemented. Moreover, use of the term "processor" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE may include Machine Type Communication (MTC) devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), access point, relay node, etcetera.

According to example embodiments of the present disclosure, the UL-DL configuration 0, 1, 2, and 6, as illustrated in the table 10.1-1 are considered since the uplink traffic can vary among 20%, 40%, 50% and 60% and the downlink traffic can vary among 40%, 50%, 60%, and 80% with these configurations, which will fit in the traffic variation well.

Figure 2:
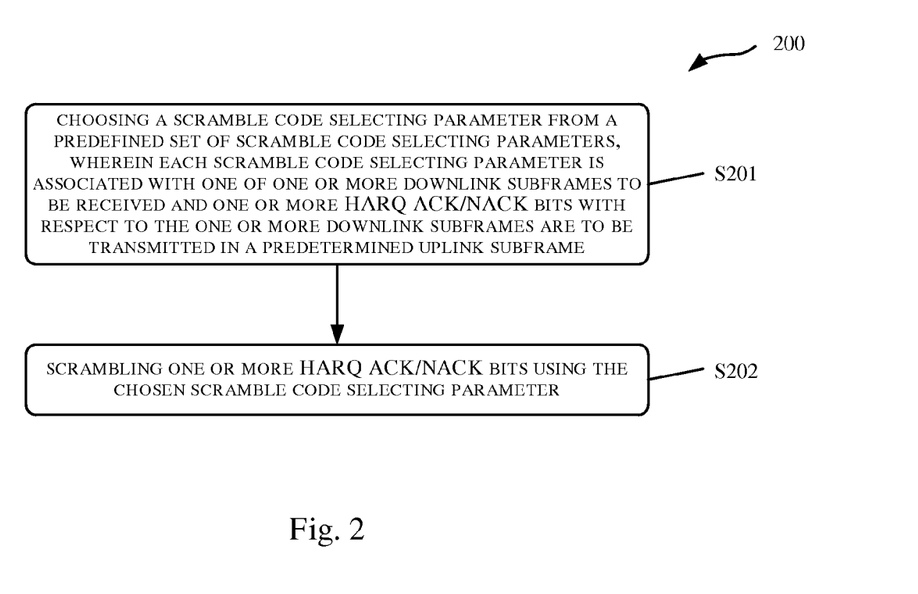
FIG. 2 is a flow chart exemplarily illustrating a method for HARQ ACK/NACK bundling on a PUSCH in a dynamic TDD system according to example embodiments of the present disclosure.

FIG. 2 is a flow chart exemplarily illustrating a method 200 for HARQ ACK/NACK bundling on a PUSCH in a dynamic TDD system according to example embodiments of the present disclosure. As illustrated in FIG. 2, the method 200, at step S201, the method 200 chooses a scramble code selecting parameter from a predefined set of scramble code selecting parameters, wherein each scramble code selecting parameter is associated with one of one or more downlink subframes to be received and one or more HARQ ACK/NACK bits with respect to the one or more downlink subframes are to be transmitted in a predetermined uplink subframe.

According to example embodiments of the present disclosure, the scramble code selecting parameter may refer to $N_{bundled}$ and a set of $N_{bundleds}$ having different value may form a set $G=\{N_{bundled,j}, J=0, 1, 2, \ldots, M\}$, i.e., $N_{bundled,j} \in G$. Further, according to the table 10.1-1, each uplink subframe n (e.g., subframe 2), i.e., the predetermined uplink subframe as mentioned above, for each TDD configuration (e.g., UL-DL Configuration 2) corresponding to a set K (e.g., a set having elements 8, 7, 4, 6), in which the element is $k_i$. The HARQ bits for downlink subframe $n-k_i$ is transmitted in the uplink subframe n, bundled together with other HARQ bits for subframe $n-k_j$, $k_j \in K$, if the UE detects downlink assignment in subframe $n-k_j$ or detects a missed downlink assignment for subframe $n-k_j$. According to step S201, each $k_j$ in the set K for each uplink subframe of each TDD configuration will be associated with $N_{bundled}$, where $N_{bundled,j} \in G$.

At step S202, the method 200 scrambles one or more coded HARQ ACK/NACK bits using the chosen scramble code selecting parameter or the calculated scramble code selecting parameter for bundling on the PUSCH.

According to example embodiments of the present disclosure, step S201 is performed based on a DAI in a downlink control information format 0 or 4 being unavailable. As noted previously, DAI is not available in the dynamic TDD system and therefore the value of the $N_{bundled}$ cannot be determined. However, with the choosing step S201, it would be possible for the UE to use a proper $N_{bundled}$ to scramble the HARQ ACK/NACK bits.

In some example embodiments, the choosing step S201 further comprises choosing a scramble code selecting parameter that is associated with the last received downlink subframe. For example, the parameter will be $N_{bundled,u}$ if the UE detects a downlink assignment in downlink subframes $(n-k)$, $k_v \in K$ and $$k_u = \max_{k_v \in K}(n - k_v).$$

In other words, the UE would choose the $N_{bundled,u}$ from the set G that is associated with the element $k_v$ to scramble one or more HARQ ACK/NACK bits.

During the detection of the downlink assignment, if $U_{DAI}>0$ and $V_{DAI}^{DL} \neq (U_{DAI}-1) \mod 4+1$, the UE would detect that at least one downlink assignment has been missed and the UE shall generate NACK for all codewords. The UE shall not transmit HARQ-ACK if $U_{DAI}+N_{SPS}=0$. In this manner, the eNB could be aware of the missing detection in the UE if the correct value for $N_{bundled}$ is not used.

Figure 3:
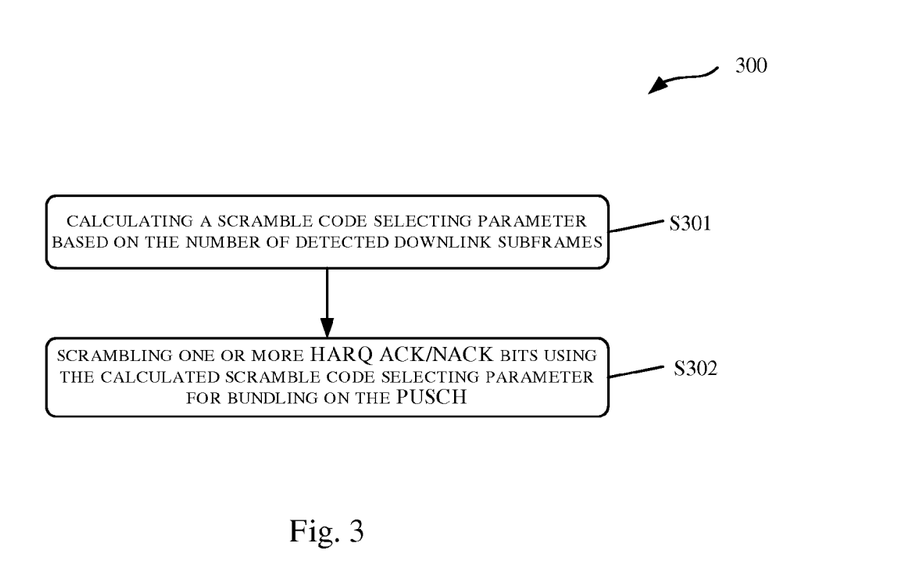
FIG. 3 is a flow chart exemplarily illustrating another method for HARQ ACK/NACK bundling on a PUSCH in a dynamic TDD system according to example embodiments of the present disclosure.

FIG. 3 is a flow chart exemplarily illustrating another method for HARQ ACK/NACK bundling on a PUSCH in a dynamic TDD system according to example embodiments of the present disclosure. As illustrated in FIG. 3, at step S301, the method 300 calculates a scramble code selecting parameter based on the number of detected downlink subframes. Then, at step S302, the method 300 scrambles one or more HARQ ACK/NACK bits using the calculated scramble code selecting parameter for bundling on the PUSCH. Similar to the method 200, the calculating step S301 is performed based on the DAI in a downlink control information format 0 or 4 being unavailable.

In some example embodiments of the present disclosure, the calculating step S301 comprises calculating the scramble code selecting parameter by an equation as follows:

$$N_{bundled}=(U_{DAI}+N_{SPS})$$

wherein $N_{bundled}$ denotes the scramble code selecting parameter, $U_{DAI}$ denotes the total number of physical downlink control channels (PDCCHs) with assigned physical downlink sharing channel (PDSCH) transmissions and PDCCH indicating downlink semi-persistent scheduling (SPS) release detected by a UE within one or more received downlink subframes, $N_{SPS}$ denotes the number of PDSCH transmissions without a corresponding PDCCH within the one or more received subframe, and $U_{DAI}+N_{SPS}$ denotes the number of received downlink subframes. Further, similar to the method 200, if $U_{DAI}>0$ and $V_{DAI}^{DL} \neq (V_{DAI}-1) \mod 4+1$, the UE would detect that at least one downlink assignment has been missed and the UE shall generate NACK for all codewords. The UE shall not transmit HARQ-ACK if $U_{DAI}+N_{SPS}=0$.

The methods 200 and 300, which may be implemented at the UE, can be advantageously applied in the dynamic TDD system. In particular, the methods 200 and 300 including additional steps according to example embodiments of the present disclosure can be advantageously used for the case that the UE is transmitting on PUSCH and the PUSCH transmission is adjusted based on a detected PDCCH with DCI format 0/4 or with uplink grant intended for the UE and dynamic configuration is enabled. By means of the methods 200 and 300, a proper $N_{bundled}$ can be selected even if the value of the $V_{DAI}^{UL}$ is not available in the DCI format 0/4.

Figure 4:
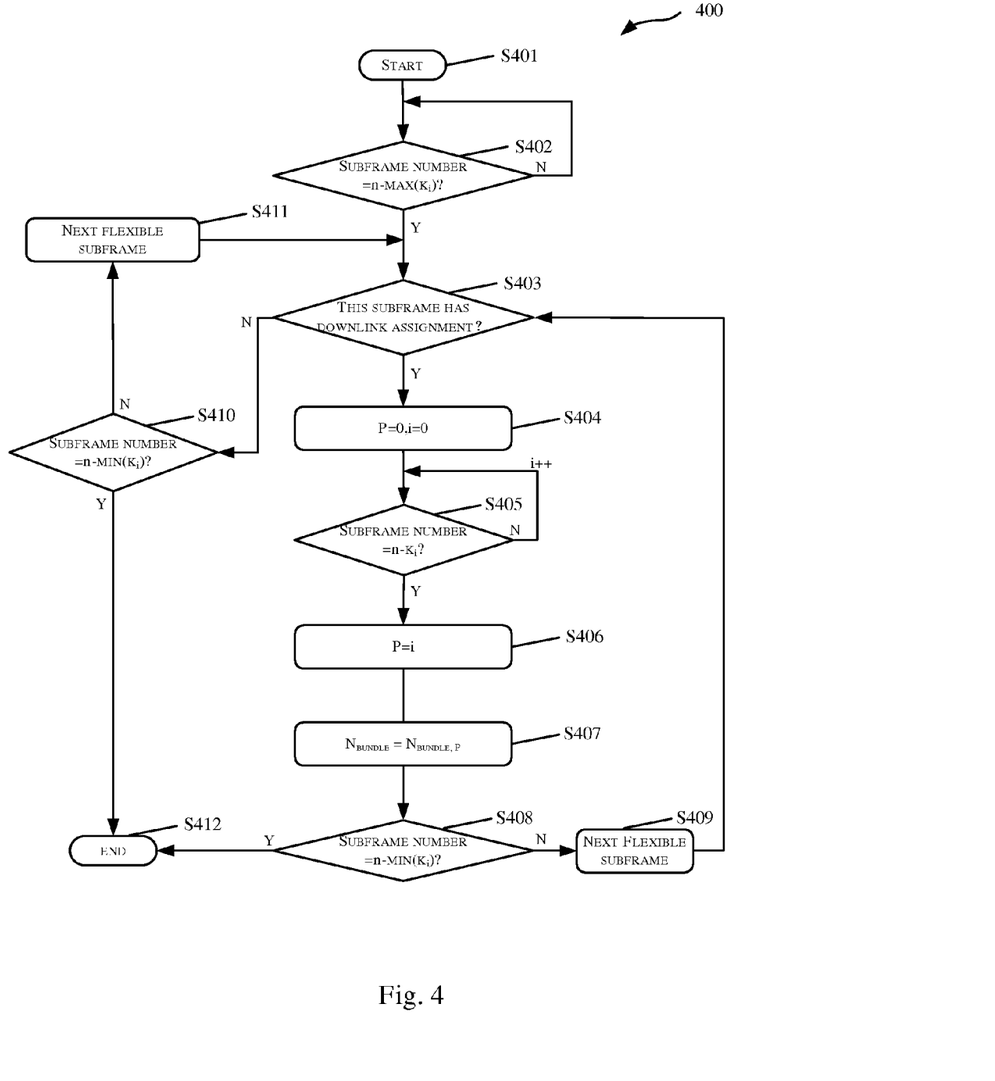
FIG. 4 is a flow chart exemplarily illustrating a method for selection of a scramble code selecting parameter from a predefined set of scramble code selecting parameters as illustrated in FIG. 2 according to example embodiments of the present disclosure.

FIG. 4 is a flow chart exemplarily illustrating a method 400 for selection of a scramble code selecting parameter from a predefined set of scramble code selecting parameters as illustrated in FIG. 2 according to example embodiments of the present disclosure. For a better understanding of the method 400, the steps will be discussed taking uplink subframe 2 with UL-DL Configuration 2 as an example. In particular, as shown in the table 10.1-1, in the uplink subframe 2 with the UL-DL Configuration 2, the set K is {8, 7, 4, 6} which is also denoted as {$k_0$, $k_1$, $k_2$, $k_3$}. The association relationship between the $N_{bundled}$ set {$N_{bundled,j}$, j=0, 1, 2, 3} to K is denoted as $N_{bundled,0} \to k_0$, $N_{bundled,1} \to k_1$, $N_{bundled,2} \to k_2$, and $N_{bundled,3} \to k_3$. It is further assumed that the eNB has downlink assignment for the UE in subframe 4 $((n-k_0) \mod 10)$, 5 $((n-k_1) \mod 10)$ and 6 $((n-k_3) \mod 10)$, and no downlink assignment in subframe 8 $((n-k_2) \mod 10)$.

As illustrated in FIG. 4, the method 400 starts at step S401 and proceeds to step S402, at which the method 400 determines whether the subframe number is equal to $n-\max(k_i)$. Because the $\max(k_i)$ in this example is 8 and n is 2, subframe number=$(2-8) \mod 10=4$. Therefore, the method 400 determines in this example whether downlink subframe 4 is received. It can be understood that the intention of the step S402 is to determine whether the first downlink subframe with respect to which the HARQ ACK/NACK would be bundled on the uplink subframe 2 is received. If this first downlink subframe is not received, then the method 400 loops back to determine again until this first downlink subframe is received.

Upon receipt of this first downlink subframe, at step S403, the method 400 determines whether this subframe has downlink assignment. If this is the case, at step S404, the method 400 sets two intermediate variables P and i as having initial value 0. Then, the method 400 proceeds to step S405, at which the method 400 determines whether subframe number is equal to $n-k_i$. If this is the case, the value of the variable "i" is given to P at step S406; otherwise, the value of the variable "i" is increased by one and the flow goes back to step S405. Continue with the example, the current subframe number 4 is equal to $n-k_0$, and then the value of the variable "i" 0 is given to P.

At step S407, the $N_{bundle,p}$ is set to the current $N_{bundle}$. In this example, $N_{bundled,0}$ is set to be a potential $N_{bundled}$. After that, the method 400 advances to step S408, at which the method 400 determines whether the subframe number is equal to $n-\min(K_i)$. In other words, the method 400 checks whether the current downlink subframe is the last downlink subframe. If this is the case, the method 400 will end at step S412. Otherwise, the method 400 switches to step S409. In this example, the last downlink subframe is subframe 8 (i.e., (2-4) mod 10) and the current subframe is subframe 4 which is not the last subframe.

As step S409, the method 400 may perform similar operations to the next flexible subframe. In this example, the method 400 may return to step S403 and determine whether the received downlink subframe 6 has downlink assignment. If this is the case, the method proceeds to steps S404 and S405, as discussed above. At step S405, since the subframe number 5 is not equal to $n-k_0$, the intermediate variable "i" is increased by one, i.e., "i" being updated to 1. It is then determined that the subframe number 5 is equal to $n-k_1$ at step S405 and the flow jumps out of the loop. At step S406, the value 1 of the "i" is give to the "P" and then at step S407, the previous potential $N_{bundled}$ is updated to $N_{bundled,1}$. Similarly, the method 400 may perform the same operations on the subframes 6 and 8 and select the $N_{bundled,3}$ associated with the subframe 6 as a final $N_{bundled}$ for scrambling HARQ ACK/NACK bits.

Regarding subframe 8, since it is the last flexible subframe and is determined at step S403 as having no downlink assignment, as assumed before, the method 400 proceeds to step S410, at which it is determined that the subframe number 8 is equal to $n-\min(k_i)$ (i.e., (2-4) mod 10). Then the method 400 ends at step S412.

In some cases, it may be determined at step S401 that the subframe having no downlink assignment is not the last flexible subframe and then the method 400 advances to step S411 and performs the same or similar operations as discussed above to the next flexible subframe.

According to the method 400, it is easy to select a proper $N_{bundled}$ for scrambling one or more HARQ ACK/NACK bits without the knowledge of the $V_{DAI}^{UL}$. Thus, the method 400 can be advantageously applied in the dynamic TDD system.

Figure 5:
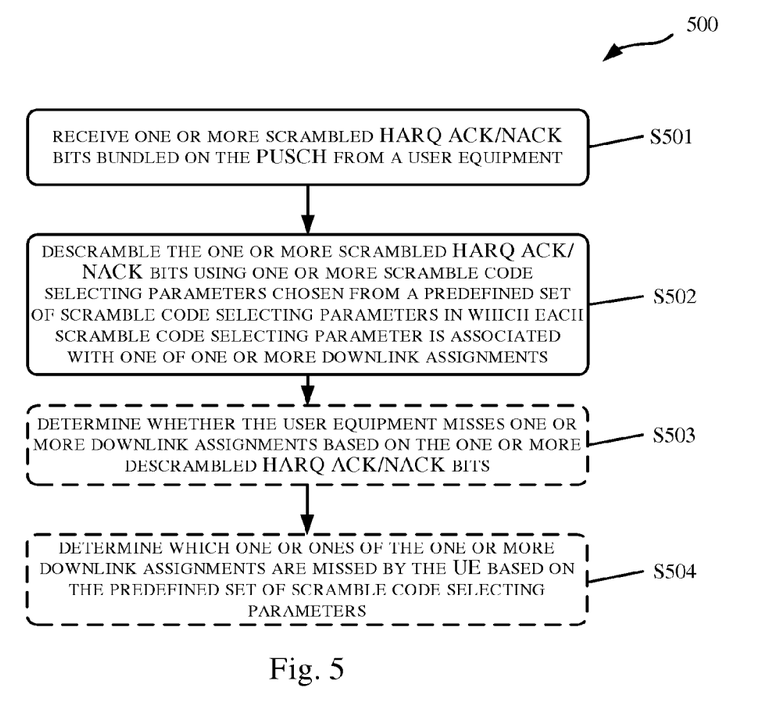
FIG. 5 is a flow chart exemplarily illustrating another method for HARQ ACK/NACK bundling on a PUSCH in a dynamic TDD system according to example embodiments of the present disclosure.

FIG. 5 is a flow chart exemplarily illustrating another method 500 for HARQ ACK/NACK bundling on a PUSCH in a dynamic TDD system according to example embodiments of the present disclosure. As illustrated in FIG. 5, at step S501, the method 500 receives one or more scrambled HARQ ACK/NACK bits bundled on the PUSCH from a UE.

The one or more scrambled HARQ ACK/NACK bits herein could be referred to those bits that are scrambled using the $N_{bundled}$ selected from the predefined set of $N_{bundleds}$ as discussed in the method 200. Then at step S502, the method 500 descrambles the one or more scrambled HARQ ACK/NACK bits using one or more scramble code selecting parameters chosen from a predefined set of scramble code selecting parameters in which each scramble code selecting parameter is associated with one of one or more downlink assignments. It is to be understood that the method 500 uses the same set of scramble code selecting parameters as that used by the UE to descramble the HARQ ACK/NACK bits.

In some example embodiments, the method 500 may further determine, at step S503, whether the UE misses one or more downlink assignments based on the one or more descrambled HARQ ACK/NACK bits. For example, as discussed in the method 400, if the eNB has downlink assignment for the UE in subframe 4 $(n-k_0)$, 5 $(n-k_i)$, and 6 $(n-k_2)$, and has no downlink assignment in subframe 8 $(n-k_3)$, then if the method 200 or 400 has been correctly implemented, the UE will use $N_{bundled}=N_{bundled,2}$ for the HARQ reporting. In response thereto, the eNB may use $N_{bundled}=N_{bundled,2}$ to descramble the HARQ bits. If the eNB detects no HARQ bits in the PUSCH, then it may determine that the UE missed at least the last downlink assignment, possibly due to the low quality of the air interface.

In some example embodiments, the method 500 may further determine, at step S504, which one or ones of the one or more downlink assignments are missed by the UE based on the predefined set of scramble code selecting parameters. For example, if the eNB descrambles the HARQ bits in PUSCH using $N_{bundled}=N_{bundled,j}$ one by one, i.e., performing a blind detection, and if the eNB successfully detects the HARQ bits using $N_{bundled,v}$, then it may exactly know which downlink subframe(s) has been missed by the UE.

Figure 6:
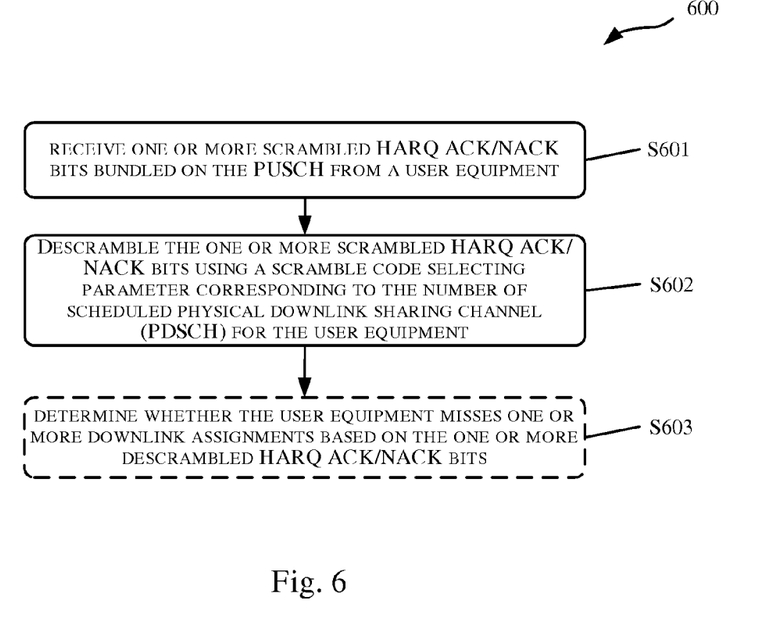
FIG. 6 is a flow chart exemplarily illustrating another method for HARQ ACK/NACK bundling on a PUSCH in a dynamic TDD system according to example embodiments of the present disclosure.

FIG. 6 is a flow chart exemplarily illustrating another method 600 for HARQ ACK/NACK bundling on a PUSCH in a dynamic TDD system according to example embodiments of the present disclosure. As illustrated in FIG. 6, at step S601, the method 600 receives one or more scrambled HARQ ACK/NACK bits bundled on the PUSCH from a UE. Then at step S602, the method 600 descrambles the one or more scrambled HARQ ACK/NACK bits using a scramble code selecting parameter corresponding to the number of scheduled physical downlink sharing channels (PDSCHs) for the UE. It can be understood that the scramble code selecting parameter as used herein may refer to or correspond to the one used in the method 300.

In some example embodiments, the method 600 may further determine, at step S603, whether the UE misses one or more downlink assignments based on the one or more descrambled HARQ ACK/NACK bits. For example, the eNB could detect the HARQ bits in the PUSCH setting the parameter $N_{bundled}$ to the number of scheduled PDSCH for the UE in the counting interval, as illustrated in table 10.1-1 by each specified or predetermined uplink subframe. The eNB will find out that the UE did not miss any downlink assignment if the detection result for HARQ ACK/NACK bits is not discontinuous transmission (DTX); otherwise, the eNB will know that the UE missed at least one downlink assignment.

By means of the methods 500 and 600, it is possible for the eNB to know which downlink assignment is missed by the UE and therefore the eNB would only need to retransmit the transmission blocks that the UE missed, if the reported ACK/NACK is NACK.

Figure 7:
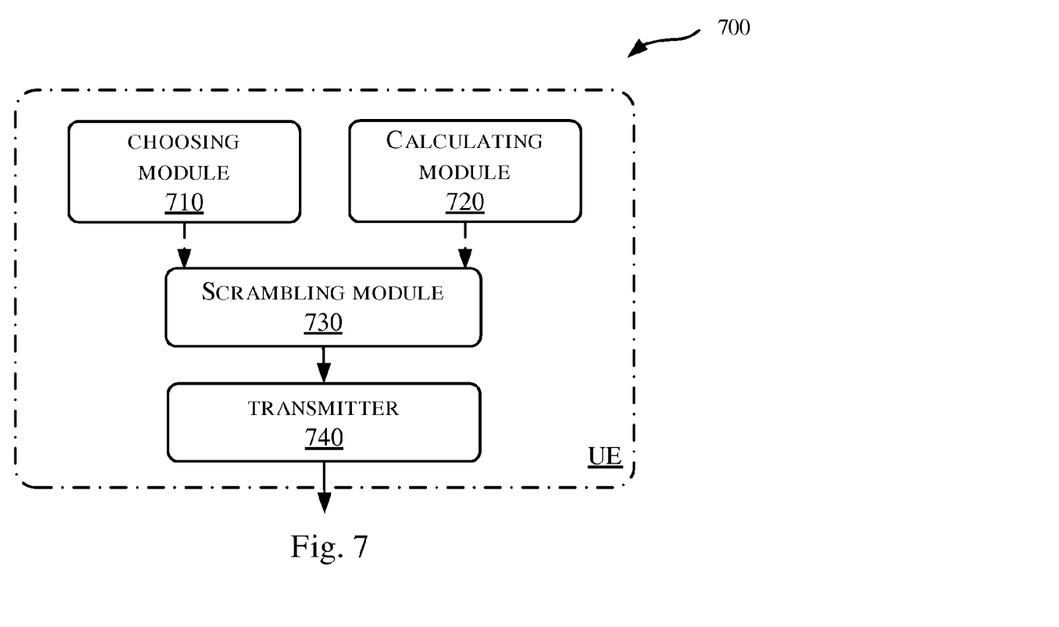
FIG. 7 is a schematic block diagram of a UE according to example embodiments of the present disclosure.

FIG. 7 is a schematic block diagram of a UE 700 according to example embodiments of the present disclosure. As illustrated in FIG. 7, the UE 700 comprises a choosing module 710 configured to choose a scramble code selecting parameter from a predefined set of scramble code selecting parameters, wherein each scramble code selecting parameter is associated with one of one or more downlink subframes to be received and one or more HARQ ACK/NACK bits with respect to the one or more downlink subframes are to be transmitted in a predetermined uplink subframe, or a calculating module 720 configured to calculate a scramble code selecting parameter based on the number of detected downlink subframes. The UE also comprises a scrambling module 730 configured to scramble one or more HARQ ACK/NACK bits using the chosen scramble code selecting parameter or the calculated scramble code selecting parameter for bundling on the PUSCH. Additionally, the UE comprises a transmitter 740 configured to transmit the one or more scrambled HARQ ACK/NACK bits bundled on the PUSCH to a radio network node 800.

In some example embodiments, the choosing module 710 or calculating module 720 performs based on a downlink assignment index in a downlink control information format 0 or 4 being unavailable. In some other example embodiments, the choosing module 710 is further configured to choose a scramble code selecting parameter that is associated with the last received downlink subframe.

In some example embodiments, the calculating module 720 is configured to calculate the scramble code selecting parameter by an equation as follows:

$$N_{bundled}=(U_{DAI}+N_{SPS})$$

wherein $N_{bundled}$ denotes the scramble code selecting parameter, $U_{DAI}$ denotes the total number of PDCCHs with assigned PDSCH transmissions and PDCCH indicating SPS release detected by a UE within one or more received downlink subframes, $N_{SPS}$ denotes the number of PDSCH transmissions without a corresponding PDCCH within the one or more received subframe, and $U_{DAI}+N_{SPS}$ denotes the number of received downlink subframes.

It can be understood that the UE 700 according to example embodiments of the present disclosure is able to implement the methods 200-400 such that the value of the $N_{bundled}$ can be properly and efficiently determined for scrambling the HARQ ACK/NACK bits.

Figure 8:
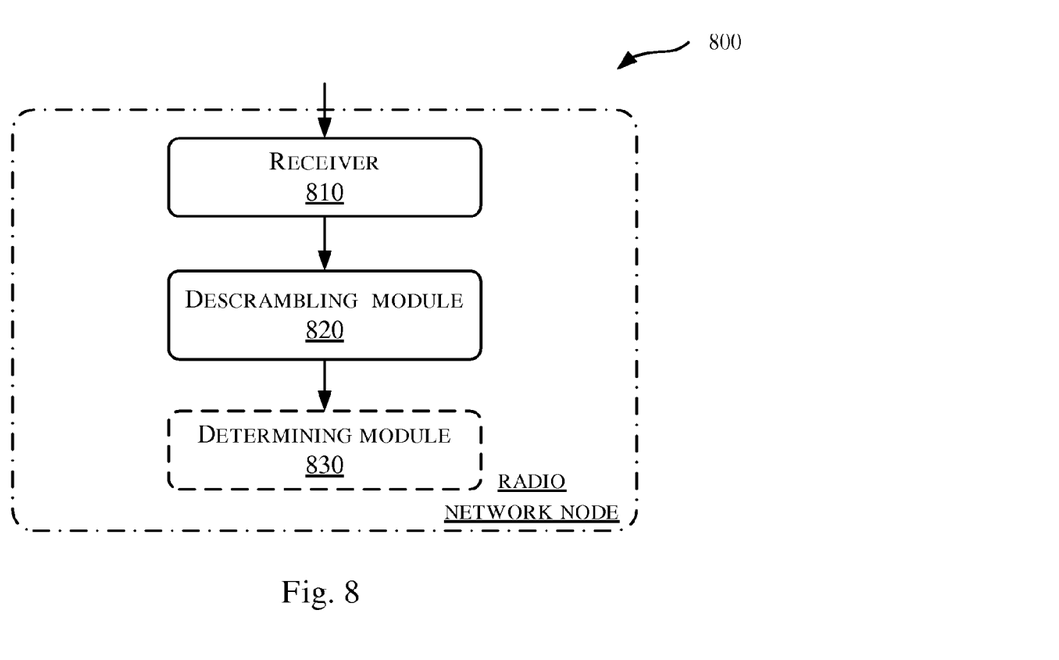
FIG. 8 is a schematic block diagram of a radio network node according to example embodiments of the present disclosure.

FIG. 8 is a schematic block diagram of a radio network node 800 according to example embodiments of the present disclosure. As illustrated in FIG. 8, the radio network node 800 comprises a receiver 810 configured to receive one or more scrambled HARQ ACK/NACK bits bundled on the PUSCH from a UE 700. The radio network node 800 further comprises a descrambling module 820 configured to descramble the one or more scrambled HARQ ACK/NACK bits using one or more scramble code selecting parameters chosen from a predefined set of scramble code selecting parameters in which each scramble code selecting parameter is associated with one of one or more downlink assignments, or configured to descramble the one or more scrambled HARQ ACK/NACK bits using a scramble code selecting parameter corresponding to the number of scheduled PDSCHs for the UE 700.

In some example embodiments, the radio network node 800 further comprises a determining module 830 configured to determine whether the UE 700 misses one or more downlink assignments based on the one or more descrambled HARQ ACK/NACK bits. In some other example embodiments, the determining module 830 is further configured to determine which one or ones of the one or more downlink assignments are missed by the UE based on the predefined set of scramble code selecting parameters.

It can be understood that the radio network node 800 can implement the methods 500 and 600 such that the radio network node 800 can determine whether the downlink assignment is missed by the UE and may further determine which one(s) is missed. The radio network node 800 may be embodied as a BS, an eNB or the like.

Although the present technology has been described above with reference to specific embodiments, it is not intended to be limited to the specific form set forth herein. For example, the embodiments presented herein are not limited to the existing TDD configuration; rather they are equally applicable to new TDD configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method for hybrid automatic retransmission request acknowledgement/negative acknowledgement (HARQ ACK/NACK) bundling on a physical uplink sharing channel (PUSCH) in a dynamic time division duplex (TDD) system, the method comprising:
   receiving, at a user equipment operating in the dynamic TDD system, a plurality of subframes, each subframe of the plurality of subframes comprising a downlink control information (DCI) that does not include bits used for a downlink assignment index (DAI);
   choosing a scramble code selecting parameter from a set of predefined scramble code selecting parameters, wherein:
      each scramble code selecting parameter of the set of predefined scramble code selecting parameters is associated with a downlink subframe; and
      choosing the scramble code selecting parameter comprises determining whether each received subframe of the plurality of subframes includes a downlink assignment and choosing the scramble code selecting parameter associated with a last received subframe of the plurality of subframes that includes a downlink assignment for the user equipment;
   scrambling one or more HARQ ACK/NACK bits using the chosen scramble code selecting parameter for bundling HARQ ACK/NACK responses to the received plurality of subframes; and
   transmitting the scrambled one or more HARQ ACK/NACK bits bundled on the PUSCH in the dynamic TDD system;
   wherein the chosen scramble code selecting parameter is used to associate the transmitted scrambled one or more HARQ ACK/NACK bits with their associated subframe without using a DAI and without using a carrier aggregation with a frequency division duplex (FDD) system.

2. The method according claim 1, further comprising:
   determining none of the received subframes of the plurality of subframes includes a downlink assignment; and
   transmitting the PUSCH without bundled HARQ ACK/NACK bits.

3. The method according to claim 1, wherein determining whether a received subframe of the plurality of subframes includes a downlink assignment comprises determining whether the received subframe includes a physical downlink control channel (PDCCH) with an assigned physical downlink sharing channel (PDSCH) transmission and PDCCH indicating downlink semi-persistent scheduling (SPS) release or a PDSCH transmission without a corresponding PDCCH.

4. A method for hybrid automatic retransmission request acknowledgement/negative acknowledgement (HARQ ACK/NACK) bundling on a physical uplink sharing channel (PUSCH) in a dynamic time division duplex (TDD) system, comprising:
   transmitting a plurality of downlink subframes to a user equipment operating in the dynamic TDD system, each subframe of the plurality of subframes comprising a downlink control information (DCI) that does not include bits used for a downlink assignment index (DAI);
   receiving one or more scrambled HARQ ACK/NACK bits bundled on the PUSCH in the dynamic TDD system from the user equipment, the bundled HARQ ACK/NACK bits providing a HARQ ACK/NACK response to the plurality of downlink subframes transmitted to the user equipment;
   choosing a scramble code selecting parameter from a set of predefined scramble code selecting parameters, wherein:
      each scramble code selecting parameter of the set of predefined scramble code selecting parameters is associated with one of the plurality of downlink subframes; and
      choosing the scramble code selecting parameter comprises choosing the scramble code selecting parameter associated with the last transmitted downlink subframe of the plurality of downlink subframes;
   descrambling the one or more scrambled HARQ ACK/NACK bits using the chosen scramble code selecting parameter;
   wherein the chosen scramble code selecting parameter is used to associate the transmitted scrambled one or more HARQ ACK/NACK bits with their associated subframe without using a DAI and without using a carrier aggregation with a frequency division duplex (FDD) system.

5. The method according to claim 4, further comprising:
   determining the user equipment missed one or more downlink assignments based on the one or more descrambled HARQ ACK/NACK bits.

6. The method according to claim 5, further comprising:
   determining which one or ones of the one or more downlink assignments the user equipment missed by descrambling the one or more scrambled HARQ ACK/NACK bits using one or more of the scramble code selecting parameters from the predefined set of scramble code selecting parameters.

7. A user equipment for hybrid automatic retransmission request acknowledgement/negative acknowledgement (HARQ ACK/NACK) bundling on a physical uplink sharing channel (PUSCH) in a dynamic time division duplex (TDD) system, the user equipment comprising a processor and a transmitter, the processor operable to:
   receive a plurality of subframes, each subframe of the plurality of subframes comprising a downlink control information (DCI) that does not include bits used for a downlink assignment index (DAI);
   choose a scramble code selecting parameter from a set of predefined scramble code selecting parameters, wherein:
      each scramble code selecting parameter of the set of predefined scramble code selecting parameters is associated with a downlink subframe; and
      the processor is operable to:
         determine whether each received subframe of the plurality of subframes includes a downlink assignment and choose the scramble code selecting parameter associated with a last received subframe of the plurality of subframes that includes a downlink assignment for the user equipment; and
         scramble one or more HARQ ACK/NACK bits using the chosen scramble code selecting parameter for bundling HARQ ACK/NACK responses to the received plurality of subframes; and the transmitter is operable to transmit the one or more scrambled HARQ ACK/NACK bits bundled on the PUSCH in the dynamic TDD system to a radio network node;

wherein the chosen scramble code selecting parameter is used to associate the transmitted scrambled one or more HARQ ACK/NACK bits with their associated subframe without of using a DAI and without using a carrier aggregation with a frequency division duplex (FDD) system.

8. The user equipment according to claim 7, wherein:
the processor is further operable to determine none of the received subframes of the plurality of subframes includes a downlink assignment; and
the transmitter is further operable to transmit the PUSCH without bundled HARQ ACK/NACK bits.

9. The user equipment according to claim 7, wherein the processor is operable to determine whether a received subframe of the plurality of subframes includes a physical downlink control channel (PDCCH) with an assigned physical downlink sharing channel (PDSCH) transmission and PDCCH indicating downlink semi-persistent scheduling (SPS) release or a PDSCH transmission without a corresponding PDCCH.

10. A radio network node for hybrid automatic retransmission request acknowledgement/negative acknowledgement (HARQ ACK/NACK) bundling on a physical uplink sharing channel (PUSCH) in a dynamic time division duplex (TDD) system, the radio network node comprising a transmitter, a receiver, and a processor:

the transmitter is operable to transmit a plurality of downlink subframes to a user equipment, each subframe of the plurality of subframes comprising a downlink control information (DCI) that does not include bits used for a downlink assignment index (DAI);

the receiver is operable to receive one or more scrambled HARQ ACK/NACK bits bundled on the PUSCH in the dynamic TDD system from the user equipment, the bundled HARQ ACK/NACK bits providing a HARQ ACK/NACK response to the plurality of downlink subframes transmitted to the user equipment;

the processor is operable to:
choose a scramble code selecting parameter from a set of predefined scramble code selecting parameters, wherein:
each scramble code selecting parameter of the set of predefined scramble code selecting parameters is associated with one of the plurality of downlink subframes; and the processor is operable to choose the scramble code selecting parameter associated with the last transmitted downlink subframe of the plurality of downlink subframes;

wherein the chosen scramble code selecting parameter is used to associate the transmitted scrambled one or more HARQ ACK/NACK bits with their associated subframe without using a DAI and without using a carrier aggregation with a frequency division duplex (FDD) system.

11. The radio network node according to claim 10, wherein the processor is further operable to determine the user equipment missed one or more downlink assignments based on the one or more descrambled HARQ ACK/NACK bits.

12. The radio network node according to claim 11, wherein the processor is further operable to determine which one or ones of the one or more downlink assignments the user equipment missed by descrambling the one or more scrambled HARQ ACK/NACK bits using one or more of the scramble code selecting parameters from the predefined set of scramble code selecting parameters.

* * * * *